(12) United States Patent
Mead (10) Patent No.: US 7,725,370 B2
(45) Date of Patent: May 25, 2010

(54) SYSTEM AND METHOD FOR OUTSOURCE SUPPLIER MANAGEMENT

(75) Inventor: Christopher J. Mead, Scottsdale, AZ (US)

(73) Assignee: B/E Aerospace, Inc., Wellington, FL (US)

( * ) Notice: Subject to any disclaimer, the term of this patent is extended or adjusted under 35 U.S.C. 154(b) by 1646 days.

(21) Appl. No.: 10/856,889

(22) Filed: May 27, 2004

(65) Prior Publication Data
US 2005/0267822 A1 Dec. 1, 2005

(51) Int. Cl.
*G06F 17/50* (2006.01)

(52) U.S. Cl. ........................................... 705/29

(58) Field of Classification Search .................. 705/29, 705/7, 10; 235/375, 380
See application file for complete search history.

(56) References Cited

U.S. PATENT DOCUMENTS

| | | | |
|---|---|---|---|
| 5,541,394 A | 7/1996 | Kouchi et al. | |
| 5,694,551 A | 12/1997 | Doyle et al. | |
| 6,015,167 A * | 1/2000 | Savino et al. | 283/67 |
| 6,148,291 A * | 11/2000 | Radican | 705/28 |
| 6,219,653 B1 * | 4/2001 | O'Neill et al. | 705/400 |
| 6,405,177 B1 | 6/2002 | DiMattina | |
| 6,587,827 B1 | 7/2003 | Hennig et al. | |
| 7,003,369 B1 * | 2/2006 | Gage | 700/132 |
| 7,006,988 B2 * | 2/2006 | Lin et al. | 705/26 |
| 7,013,001 B1 * | 3/2006 | Felger et al. | 379/115.02 |
| 7,054,844 B2 * | 5/2006 | Fletcher et al. | 705/75 |
| 7,124,107 B1 | 10/2006 | Pishevar et al. | |
| 7,143,053 B2 * | 11/2006 | Barnard et al. | 705/7 |
| 7,177,828 B1 | 2/2007 | Land et al. | |
| 7,257,552 B1 * | 8/2007 | Franco | 705/28 |
| 7,263,498 B1 * | 8/2007 | Van Horn et al. | 705/26 |
| 7,346,584 B2 * | 3/2008 | Hamada et al. | 705/51 |
| 7,403,903 B2 * | 7/2008 | Barnard et al. | 705/7 |
| 7,516,094 B2 * | 4/2009 | Perkowski | 705/27 |
| 7,533,040 B2 * | 5/2009 | Perkowski | 705/27 |
| 7,574,383 B1 * | 8/2009 | Parasnis et al. | 705/28 |
| 2001/0032143 A1 | 10/2001 | Haseltine | |
| 2001/0034670 A1 | 10/2001 | Blair | |
| 2002/0103660 A1 | 8/2002 | Cramon et al. | |
| 2002/0116241 A1 | 8/2002 | Sandhu et al. | |
| 2003/0093340 A1 | 5/2003 | Krystek et al. | |

OTHER PUBLICATIONS

PCT International Search Report, PCT/US05/18943, dated Sep. 28, 2007.

* cited by examiner

*Primary Examiner*—Andrew Joseph Rudy
(74) *Attorney, Agent, or Firm*—Drinker Biddle & Reath LLP (57) ABSTRACT

A system and method for is provided for outsource supplier management that facilitates improved order communication between customers, sellers and outsource suppliers. During order processing the supplier management system automatically receives the order from the customer and passes the order to the outsource supplier along with order, material and shipping parameters. The outsource supplier ships the product directly to the customer using the parameters provided with the order. When the product is shipped from the outsource supplier, shipment data is sent from the outsource supplier to the seller. The seller virtually receives the parts in the seller's inventory, and creates an invoice to pay the outsource supplier. The original order from the customer is matched with the virtual inventory and the product is virtually shipped from the seller to the customer. The customer is then invoiced by the seller or outsource supplier depending on customer requirements.

18 Claims, 9 Drawing Sheets

850 Header

| | |
|---|---|
| Transaction Source | |
| Trans Reference No. | Ship To Post Code |
| Transaction Program | |
| Transaction Route | Ship To State Code |
| From User I.D. | |
| To User I.D. | Ship To Country Code |
| Transaction Date | |
| Proc. Status ( ,I,C, | Contact Name |
| Transaction Type N=N | |
| Price Source | Contact Phone |
| Order Type O=ORDER/Q | |
| HPG PO | Contact Fax |
| HPG Release | Ship Early Flag |
| | Priority |
| Customer PO | Order Source |
| Customer Release | Supplier Name |
| Carrier Code | FOB Method |
| Terms Code | FOB Location |
| Terms Text | Email Address |
| | Term Days |
| Ship Via | Quote Number |
| | Quote Date Eff |
| Shipper Name | Quote Date Dis |
| | Extra 1 |
| | Extra 2 |
| Shipper Freight Account Number | Extra 3 |
| Currency Code | Extra 4 |
| Quote Number | Extra 5 |
| Order Number | Extra 6 |
| | LTA # |
| Invoice Number | TRMS-DISCOUNT-PCT |
| | TRMS-DISC-DAYS-DUE |
| Number of Copies of Invoice | Cart, If Directstock |
| Sold To Name | Standard Quality Clause |
| Sold To Address Line 1 | Charge Number |
| Sold To Address Line 2 | |
| Sold To Address Line 3 | |
| Sold To Postal Code | Indicates requirement for 8130-3 or ATA106 (see note below) |
| Sold To State Code | |
| Sold To Country Code | 1EXXX where first char. 1=8130, 2 = ATA106, 3 = 8130 if eligible/otherwise ATA106 according to FPAS; 2nd char. E-export, I domestic; XXX: days early shipment. |
| Sales Person Name | |
| Ship To Number | |
| Ship To Name | Company Number |
| Ship To Address Line | |
| Ship To Address Line | |
| Ship To Address Line | |

850 Order Detail

| | |
|---|---|
| Transaction Source | |
| Trans Reference No. | Sort Field 1 |
| Detail Line No. | |
| Order Line No. | Sort Field 2 |
| Blanket PO Line Number | |
| BPCS Stocking Item Number | Sort Field 3 |
| Customer Part # | |
| | Sort Field 4 |
| Customer Stocking Number | |
| Replacement Item Number | Sort Field 5 |
| Replacement Description | |
| Authority Description | Sort Field 6 |
| Catalog Number | |
| Description | Order Message Line |
| | Part Level Quality Clause |
| Qty Ordered | Customer Package Size |
| Qty Shipped So Far | Blanket PO Line Number |
| Unit of Measure | Bin Location |
| HPG Item Price | |
| | Customer Stocking Number |
| Customer Item Price | Cart Number |
| Requested Date CYMD | Bin Location |
| Price Flag F=Fix / S=Suggested | Part Level Quality Clause |
| Change Line N=New/C=Change/D + | Package Size |
| | Special Packaging Instructions |
| NSN Part Number | Order Line Message |
| Revision | Minimum Revision |
| Quality Clause | Quality Stop |
| Customer Line# | Quality Document |
| Vendor Item Number | |
| Tax Amount | Document's to Print |
| Tax CODE | Minimum Shelf Life Remaining |
| Extra 1 | SLR Unit of Measure |
| Extra 2 | |
| Extra 3 | Cage Code Supplier Include List |
| Extra 4 | Cage Code Supplier Exclude List |
| Extra 5 | TL Ashford Bag label |
| Extra 6 | |
| LTA # | |
| Quote Number | TL Ashford Box Label |
| Quote Date Eff | |
| Quote Date Dis | Total price of order |
| Due Date | |
| Bin ID Code | |
| Cust Stocking Number | |
| Qty. Per Bag | |
| Blanket PO Line Number | |
| Spc. Pack Inst. | |

856 Header

| |
|---|
| EDI Source Code |
| EDI Transaction Number |
| Transaction Program |
| Transaction Route |
| From User I.D. |
| To User I.D. |
| Transaction Date |
| Proc. Status ( ,I,C,R) |
| BPCS Order Number |
| Remote Order Number |
| Remote Order Release |
| Carrier Code |
| Shipping Date |
| Terms Code |
| Terms |
| Freight On Board |
| Ship Via |
| Waybill |
| Total Weight |
| Weight U.O.M. |
| Number Of Cartons |
| Shipping Charge |
| Currency Code |
| Invoice Number |
| Ship To Number |
| Ship To Name |
| Ship To Address Line 1 |
| Ship To Address Line 2 |
| Ship To Address Line 3 |
| Ship To Post Code |
| Ship To State Code |
| Ship To Country Code |

856 Detail

| EDI Source Code |
|---|
| EDI Transaction Number |
| EDI Transaction Line # |
| Order Line Number |
| Item Number |
| BPCS Item Number |
| Catalog Number |
| Item Description |
| Quantity Ordered |
| Shipped So Far |
| Qty Shipped Today |
| Unit Of Measure |
| Net Selling Price |
| Priority Code |
| Customer Line# |

856 Shipping Attributes

| EDI Source Code |
|---|
| EDI Transaction Number |
| EDI Transaction Line # |
| Supplier's Lot Number |
| Qty Shipped Today - This Lot |
| Manufacturer's Lot Number |
| Batch Number |
| Manufacturer's Cage Code |
| Country of Origin |
| Date of Manufacture |
| Cure Date |
| Item Cost |
| Revision |
| Certified Documents |
| Certification Image Key |
| Quality Clause |

12
SYSTEM AND METHOD FOR OUTSOURCE SUPPLIER MANAGEMENT

FIELD OF THE INVENTION

This invention generally relates to inventory control systems, and more specifically relates to outsource supplier management.

BACKGROUND OF THE INVENTION

To be effective, modern inventory distribution systems require the ability to provide the right inventory at time and manner required by the customer. In traditional systems, inventory is stored by the seller delivered from the seller to the customer as needed. This provides the ability to deliver product to the customer as needed. Unfortunately, this type of inventory system also results in increased inventory carrying costs, including costs for inventory facilities, transaction costs, and the costs associated with money tied up in inventory. In some industries, the costs of carrying large amounts of inventory can be prohibitive.

In these industries a more effective model is one where the sellers inventory is minimized, while the seller maintains the ability to effectively deliver product to the buyer as needed. In such a system the supplier of the inventory continues to hold the product until it is ready to be shipped directly to the customer. While such systems are able to reduce inventory costs for the seller, they also introduce unwanted complexity into the transactions between buyers, sellers and suppliers.

Thus, what is needed is an improved system and method for managing inventory supplies, customer orders and transactions between buyers, sellers and outsource suppliers that delivers material specifically to the customer requirements, is traceable throughout the process and minimizes both human and inventory costs.

BRIEF SUMMARY OF THE INVENTION

The present invention provides a system and method for outsource supplier management. The system and method facilitates improved order communication between customers, sellers and outsource suppliers. Specifically, during order processing the supplier management system automatically receives the order from the customer and passes the order to the outsource supplier along with order, material and shipping parameters. The outsource supplier ships the product directly to the customer using the parameters provided with the order. When the product is shipped from the outsource supplier, shipment data is sent from the outsource supplier to the seller. The seller virtually receives the parts in the seller's inventory, and creates an invoice to pay the outsource supplier. The original order from the customer is then matched with the virtual inventory and the product is virtually shipped from the seller to the customer. The customer can then be invoiced by the seller or outsource supplier depending on customer requirements. Thus, the system and method is able to facilitate efficient order processing.

The system and method also facilitates changes to existing orders. Specifically, when the customer requests a change in a pending order, the system determines if the change requires notification to the outsource supplier. If the outsource supplier needs to be notified of the change, the seller sends a purchase order change request to the outsource supplier. The outsource supplier then determines if the change can be made, and processes the order change if possible. The outsource supplier then sends a change acknowledgement to the seller, which confirms that the order change has been made by the outsource supplier. Thus, the system and method is able to react quickly to changing customer requirements without seller intervention.

The system and method also facilitates product returns from the buyer to the outsource supplier. Specifically, when the customer requests a return material authorization (RMA), the seller creates an RMA and directs the customer to return the product to the seller for inspection as required. The seller then requests an outsource supplier return authorization (OSRA) from the outsource supplier, and delivers the returned product to the outsource supplier. The outsource supplier receives the returned product and verifies the identity of the returned product and associated OSRA. The outsource supplier receives the product into its system. The outsource supplier then inspects the parts, completes disposition and determines if the return was warranted. The outsource supplier then sends a negative shipment to the seller, effectively removing the item from the seller's inventory. When the return is determined to be justified, the outsource supplier sends a credit to the seller to match the negative shipment, thus crediting the seller's cash position.

Thus, the system and method is able to provide improved outsource supplier management by facilitating improved communication between customers, sellers and outsource suppliers.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

Figure 1:
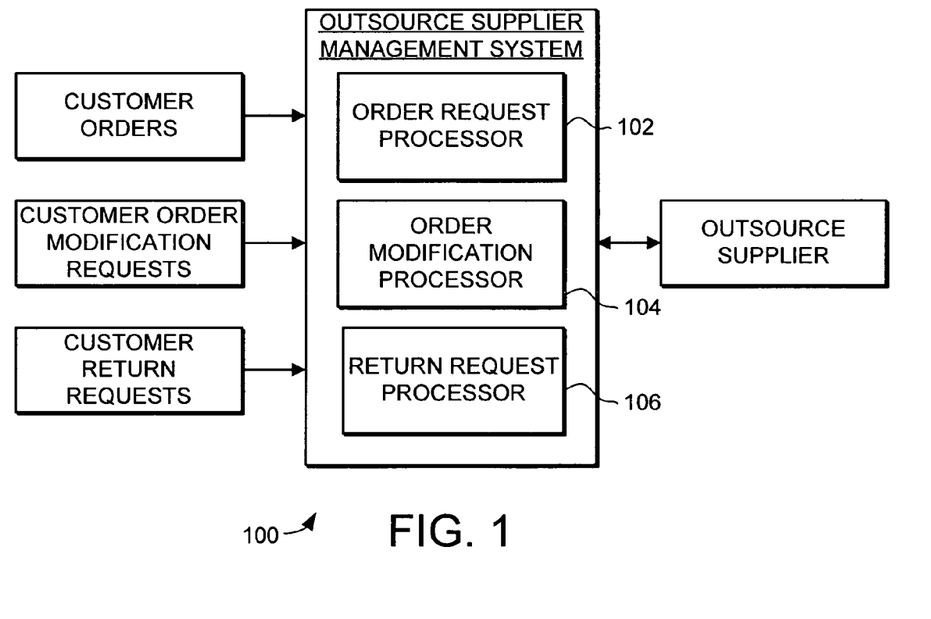
FIG. 1 is a schematic view of an outsource supplier management system in accordance with an exemplary embodiment of the present invention.

The present invention provides a system and method for outsource supplier management. The system and method facilitates improved order communication between customers, sellers and outsource suppliers. Turning now to FIG. 1, an outsource supplier management system 100 is illustrated schematically. The outsource supplier management system 100 includes an order request processor 102, and order modification processor 104, and a return request processor 106. The outsource supplier management system 100 receives customer orders, customer order modification requests, and customer return requests. The outsource supplier management system 100 processes the orders and requests, communicating with the outsource supplier and the customer as needed to facilitate outsource order processing.

Specifically, during order processing the outsource supplier management system 100 automatically receives the order from the customer and passes the order to the outsource supplier along with order, material and shipping parameters. The outsource supplier either ships the product directly to the customer using the parameters provided with the order or redirects the material to a seller facility for consolidation with other customer order shipments. When the product is shipped from the outsource supplier, shipment data is sent from the outsource supplier to the seller and the outsource supplier management system 100. The system 100 virtually receives the parts in the seller's inventory, and creates an invoice to pay the outsource supplier. The original order from the customer is then matched with the virtual inventory and the product is virtually shipped from the seller to the customer. The customer can then be invoiced by the seller or outsource supplier depending on customer requirements. Thus, the system and method is able to facilitate efficient order processing.

The system 100 also facilitates changes to existing orders. Specifically, when the customer requests a change in a pending order, the system 100 determines if the change requires notification to the outsource supplier. If the outsource supplier needs to be notified of the change, the system 100 sends a purchase order change request to the outsource supplier. The outsource supplier then determines if the change can be made, and processes the order change if possible. The outsource supplier then sends a change acknowledgement to the system 100, which confirms that the order change has been made by the outsource supplier. Thus, the system 100 is able to react quickly to changing customer requirements without seller intervention.

The system 100 also facilitates product returns from the buyer to the outsource supplier. Specifically, when the customer requests a return material authorization (RMA), the system 100 creates an RMA and if required, directs the customer to return the product to the seller for inspection as required. The system 100 then requests an outsource supplier return authorization (OSRA) from the outsource supplier, and delivers the returned product to the outsource supplier. The outsource supplier receives the returned product and verifies the identity of the returned product and associated OSRA. The outsource supplier receives the product into its system. The outsource supplier then inspects the parts, completes disposition and determines if the return was warranted. The outsource supplier then sends a negative shipment to the system 100, effectively removing the item from the seller's inventory. When the return is determined to be justified, the system 100 sends a negative payment to the outsource supplier and credits the customer. If it is not required to return the product to the seller, the system 100 can credit the customer and process an OSRA requesting compensation from the outside supplier. This can occur during short shipments and scrap at a customer's site.

Figure 2:
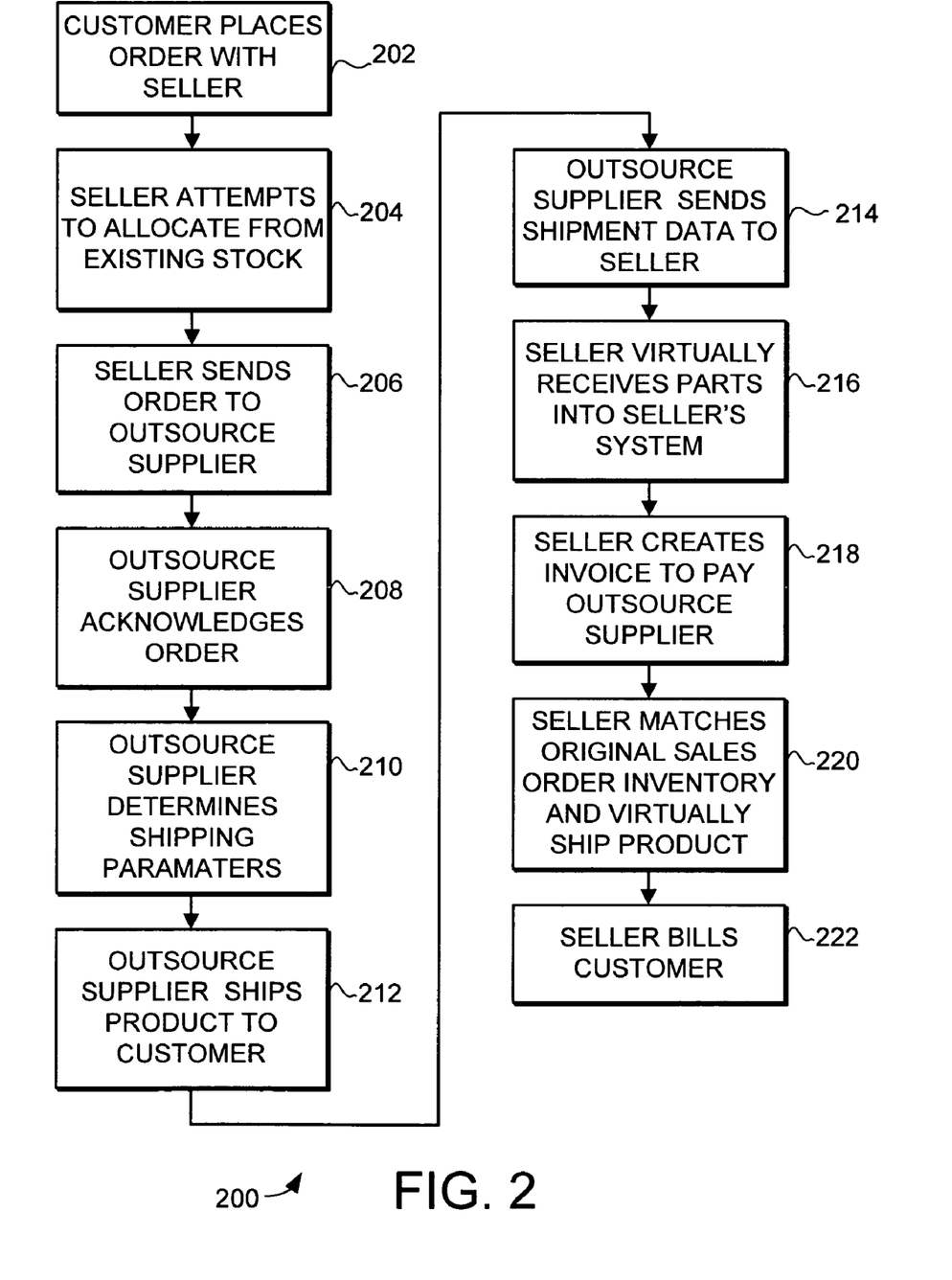
FIG. 2 is a flow diagram of a order processing method in accordance with an exemplary embodiment of the present invention.

Turning now to FIG. 2, a flow diagram illustrates a detailed example of an order request method 200. The method 200 facilitates efficient outsource supplier management and order processing, and provides tight integration between sellers and outsource suppliers. The first step 202 is for the customer to place an order with the seller. This can be done in a variety of ways. For example, the order can be placed using a website designed as an interface for seller's system. Other methods can use different communication techniques and protocols, such as electronic data interchange (EDI). Finally, the order can be placed manually by placing a call to the seller, where the seller's representative then enters the order into the system.

The next step 204 is for the seller to attempt to allocate from existing stock. In this step, the system checks the current inventory of the seller to determine if the desired part in the configuration the customer requested is on hand. In some cases, the order may be for parts that are normally kept in the seller's inventory. In other cases, the order may be for parts that are normally supplied directly by the outsource supplier but could possibly be included in the sellers inventory for a variety of reasons. In any case, step 204 check the inventory to see if all or a portion of the order is available from the seller's inventory. If the product is in inventory with the seller it can be shipped directly from the seller without any contact being made to the outsource supplier.

If the product is not within the seller's inventory, the next step 209 is for the seller to send an order to the outsource supplier. This can be accomplished in a variety of ways. For example, the system can send an EDI 850 message to the outsource supplier's system. This message would typically include an order number, an order line number and a transmission number. Additionally, the message would typically include a variety of details about the order, such as product specifications, part numbers, quantity, approved and/or unapproved suppliers and shipping details.

The next step 208 is for the outsource supplier to acknowledge the order. This allows the sellers system to verify that the outsource supplier has received the order for processing. Again, this can be done using a variety of techniques. For example, the outsource supplier can send an EDI 855 acknowledgement message to the seller's system. This confirms to the seller's system that the outsource supplier has received the order. Furthermore, the seller's system can be configured to regenerate the original order if it does not receive an acknowledgment within a defined time period. For example, the system could resend the order up to three times after 24 hours of non-response.

The next step 210 is for the outsource supplier to determine the shipping parameters. Again, shipping data was included in the original order information sent from the seller to the outsource supplier. The outsource supplier interprets this information to determine the proper shipping parameters. The next step 212 is then for the outsource supplier to package and ship the product to the customer using the specified shipping parameters. Thus, the outsource supplier provides product directly to the customer as directed by the seller. In a variation on this, the outsource supplier can send the product to the seller, where it is consolidated with other orders and sent to the customer.

The next step 214 is for the outsource supplier to send shipment data to the seller. This confirms to the seller that the item was actually shipped to the customer. The shipment data can be sent in the form of an EDI 856 message, and can include details such as when and where the product was shipped, how many were shipped, shipment details such as airway bill numbers, and a variety of other information about the shipment.

The next step 216 is for the seller to virtually receive the parts into the seller's inventory system. In this step, the seller's inventory control system behaves as though it has actually received the shipped product. As one example, the seller's system can match the outsource vendor's electronic shipment data (included in the EDI 856 message) to the original order sent to he outsource vendor. As long as the original order exists, the part number equals the originally requested part number and the quantity does not exceed in total the original order, the system will accept the electronic shipment advice and posts an inventory transaction is a specialized location of the seller's inventory control system. The outsource supplier is allowed to send multiple shipments for the same order (partial shipments) until the total for the order equals the original requested quantity. As inventory transactions are posted to the sellers inventory system, lots are created with the proper traceability information such as manufacturer, vendor and other quality data that describes the shipment sent from the outsource vendor. Thus, virtually receiving the shipped product into the seller's inventory helps facilitate tight integration between the seller, customer and outside supplier.

The next step 218 is for the system to create an invoice to pay the outsource supplier based on the product shipped. Again, as one example, this invoice can be in the form of an EDI 810 message. The next step 220 is for the system to match the original sales order with the inventory and virtually ship the product. The virtual shipment of the product "removes" the product from the seller's inventory- and thus balances the transaction made in step 216. Finally, in step 222 the seller bills the customer for the delivered product.

Thus, in steps 216-222, the seller's inventory system behaves as though the seller has received the product from the outsource supplier and shipped it to the seller itself. These virtual transactions allow the seller's system to track the shipment and maintain records of the shipment in the same manner as for shipments are taken from the seller's inventory. Thus, the shipment from the outsource supplier to the customer is tightly integrated with the sellers existing inventory control and management systems.

Method 200 thus maintains a link between the customer's order to the seller, the sellers PO to the outsource supplier, the outsource supplier's shipment to the customer and the seller's invoice to the customer for complete traceability for as many transactions as required in the marketplace.

Many variations and additions in processing can be made to method 200. As one example, additional processing can be performed to determine the correct price for the ordered item. This can involve checking to determine if the price for the ordered product is on the outsource suppliers price list. If the price is not available, up to date pricing information can be obtained from the outsource supplier and stored in the system. The order will not be passed to the outsource supplier until a valid price is established. A second variant will prevent an order from reaching the outsource supplier of the seller's customer is on credit hold with the seller. A third variant will prevent an order from being sent to the outsource supplier if there is no price (e.g., price=0) in the order between the customer and the seller. Once these situations are cleared, system will forward the order to the outsource supplier. This pricing information can be obtained directly the outsource supplier system, or it can obtained through a customer account representative.

Figure 3:
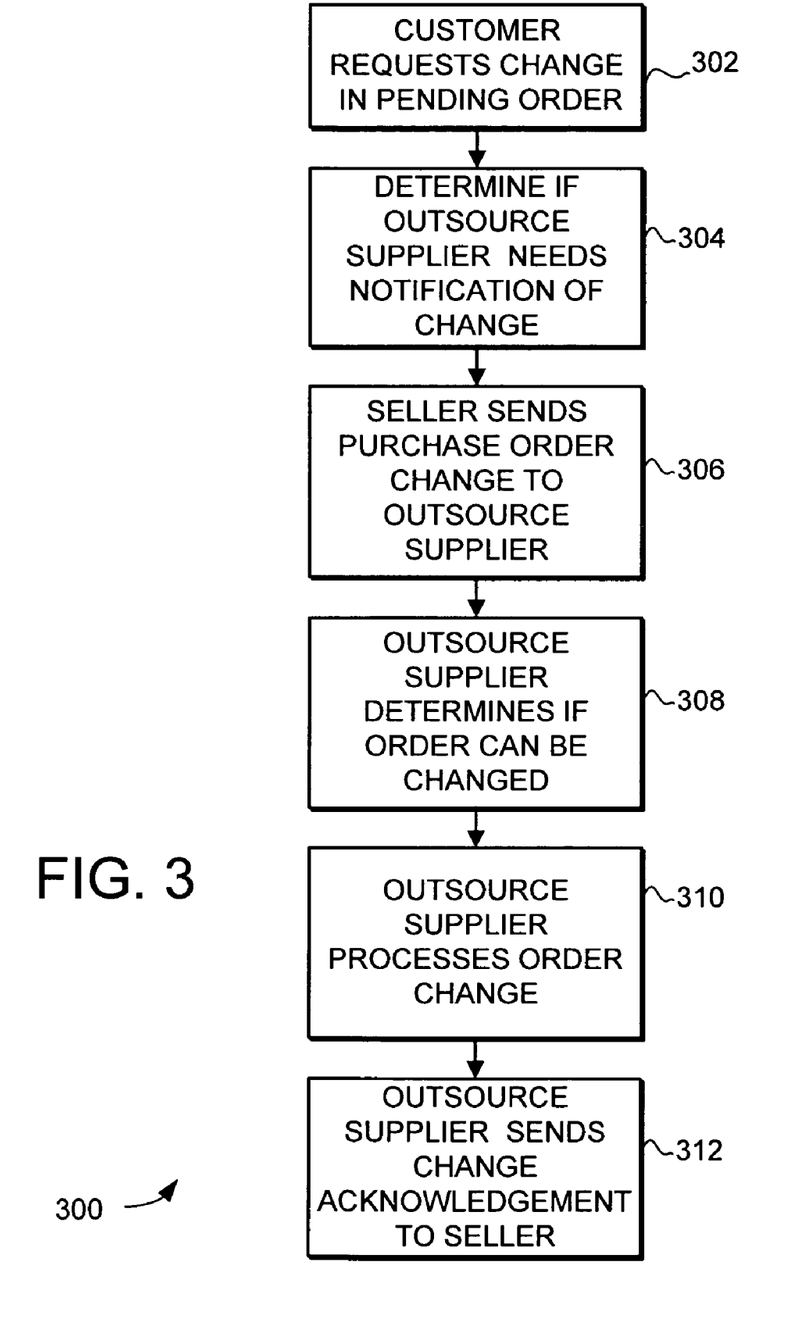
FIG. 3 is a flow diagram of a order modification method in accordance with an exemplary embodiment of the present invention.

Turning now to FIG. 3, a flow diagram illustrates a method 300 for processing changes to existing orders. The method 300 facilitates changes to existing outsource supplier orders. The first step 302 is for the customer to request a change in a pending order. Again, this request can be made using a variety of techniques, such as through an internet based system, EDI, email, or through a person to person contact with a customer service representative. Furthermore, it should be noted that the system would generally allow some changes, but not others. For example, the system can be designed to facilitate changes in quantity, dates, priority, shipping parameters and price, while not allowing changes in order number, customer number or part number. Thus, a customer could request more or less product, but could change products as that may change outsource suppliers.

When a customer has requested a change in a pending order, the next step 304 is to determine if the outsource supplier needs notification of the change. If the product is one that is shipped from the seller's inventory, then there would be no need to notify an outside supplier, and the change can be effected using the sellers on system. If, on the other hand, the product is one that this shipped directly from an outside supplier (for example, using the method 200) then the remainder of the method 300 will be used to implement this change.

In that case, the next step 306 is to send a purchase order change to the outsource supplier. This can again be accomplished using a variety of techniques. As one example, the system can send an EDI 860 message to the outsource supplier. That message would include details as to the types of order changes requested by the customer.

The next step 308 is for the outsource supplier to determine if the order can be changed. This would typically involve determining if the order had already shipped, or if other conditions exist that would prevent the order from being changed. If the order cannot be changed, a message would typically be sent to the seller. A customer account representative for the seller can then notify the customer that the change cannot be made. If the change can be made, the next step 310 is for the outsource supplier to process the order change. Again, this can involve changing the order quantity, shipping parameters or other details of the order processing. With the order processing changed, the next step 312 is for the outsource supplier to send acknowledgement of the change back to seller. This can be accomplished using an EDI 865 acknowledgement message that describes the changes to the order.

It should be noted that if the seller's system does not receive the acknowledgement within a defined time frame, it can resend the order change to the outsource supplier, effectively restarting at step 306. This can continue until the seller either receives acknowledgement that the change was made, or receives notification that the change cannot be made for some reason.

Thus, method 300 facilitates changes to order processing as requested by a customer. The method 300 delivers order changes to the seller, provides acknowledgment of the order changes back to the seller, thus confirming that the order change has been made by the outsource supplier. Thus, the method 300 is able to react quickly to changing customer requirements.

Figure 4:
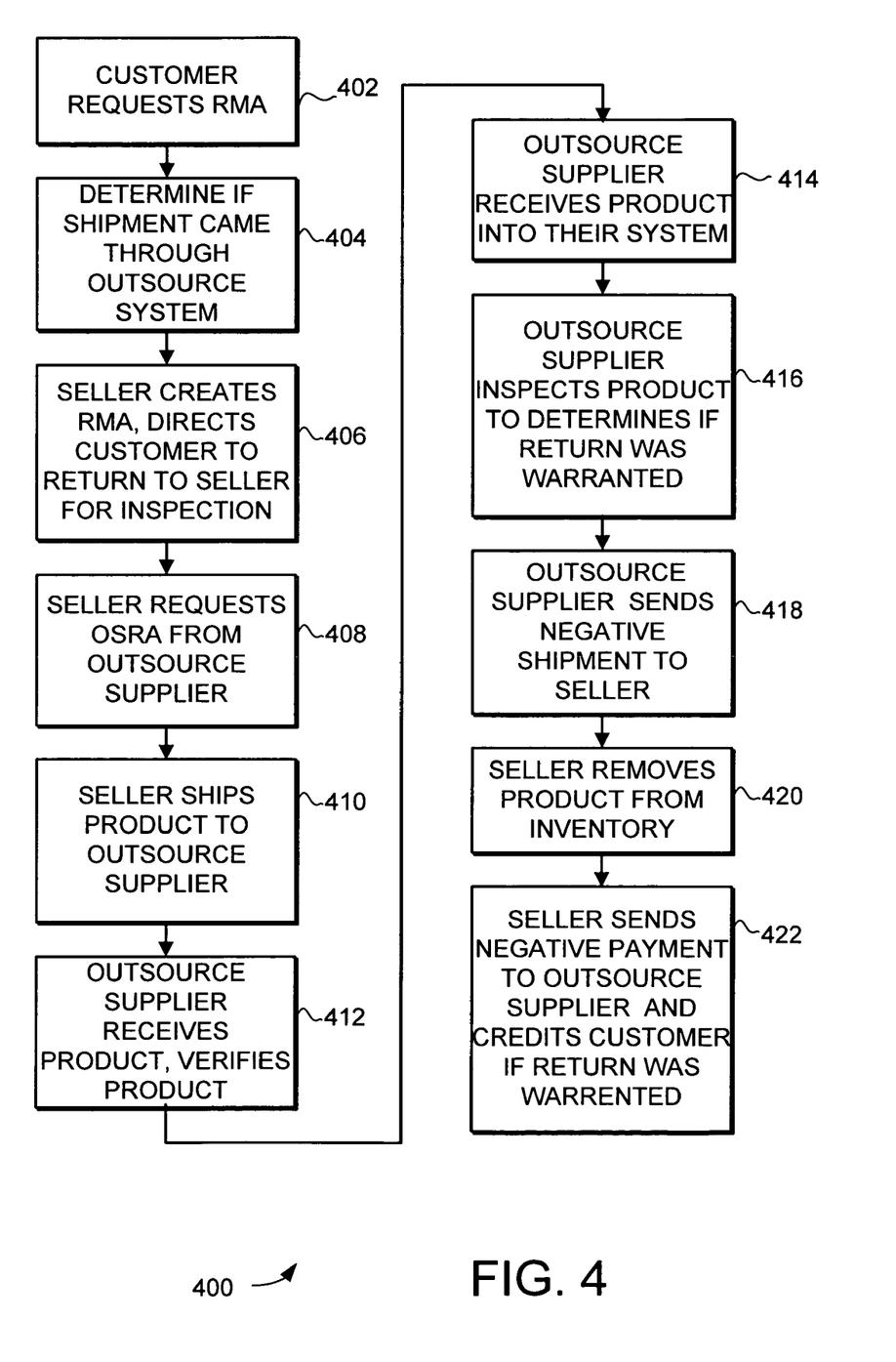
FIG. 4 is a flow diagram of a return processing method in accordance with an exemplary embodiment of the present invention.

Turning now to FIG. 4, a flow diagram illustrates a method 400 for processing order returns. The method 400 facilitates product returns from the buyer to the outsource supplier. The first step 402 occurs when a customer requests a return material authorization (RMA). This request can come directly to a customer service representative, or it can be delivered through the seller's web site. When the system receives a request for RMA, the next step 404 is to determine if the original shipment was processed through the outsource shipment management system. If the original shipment was not an outsource supplier order, then the request is delivered to customer service for further action. If the original shipment was through an outsource supplier, the next step 406 is to create an RMA and direct the customer to return the product to the seller for inspections if such an inspection is required by the seller.

When the seller receives the returned product, the seller can make inspections and make an independent evaluation of the product. For traceability purposes, the seller creates an inventory lot record describing the returned material quality and quantity. This lot record is important, as it facilitates the traceability that is required for many critical system parts. Additionally, the seller can make a record of the return, the nature of the product and the reasons for the return to facilitate quality control analysis. Furthermore, if the product is deemed not be returned, the method can instead skip to step 408.

The next step 408 is for the seller then to request a outsource supplier return authorization (OSRA) from the outsource supplier. For example, this can be implemented in a nightly transmission of all cumulative RMAs not yet completed by the outsource supplier. When received, the seller ships the returned product to the outsource supplier in step 410. In step 412, the outsource supplier receives the returned product, and verifies that the returned product corresponds to the product identified in the OSRA. With the product verified, the next step 414 is for the outsource supplier to receive the returned product into their inventory system. In the next step 416, the outsource supplier inspects the returned product to determine if the return was warranted.

If the return is determined to the not be warranted, the outsource supplier can inform the seller of its determination. The seller can then determine what action to take in regard to the customer's return of the product.

If the return was warranted, the next step 418 is for the outsource supplier to send a virtual negative shipment to the seller. This negative shipment can be in the form of an EDI 856 message, with a disposition code indicating that the return has been accepted by the outsource supplier. When received by the seller's system, the virtual negative shipment removes the returned product from the seller's inventory in step 420. The next step 422 is for the seller to send a negative payment to the outsource supplier and credit the customer of the return was warranted. The negative payment results in credit to the seller from the outsource supplier. The crediting of the customer returns the payment to the customer for the returned product. Thus, the both the seller and the customer receive appropriate payment credit for the returned product.

Thus, method 400 facilitates the return of product from a customer and provides close integration between the seller and the outsource supplier. Specifically, by keeping the product in the seller's inventory until the return is accepted by the outsource supplier, and then removing it from the seller's inventory with a virtual negative shipment, the method 400 is able to tightly control the return of the product from customer, to seller and outsource supplier.

Many different variations and additions can be made to method 400. For example, the system can be designed to batch process RMA's at a set time each day. Such an implementation would optimize communication between the seller and the outsource supplier. Other additions can include further processing where the return is found to include incorrect parts. Typically, the system would be designed to send notice to a customer account representative when such an error is detected.

The system 100 and methods 200, 300 and 400 can be implemented using a variety of techniques and systems. As discussed above, in one embodiment messages between the seller and the outsource supplier are formatted as electronic date interchange (EDI) messages. EDI messages are designed to conform to a set of standards that promotes communication between disparate computer systems. By formatting the messages in standard EDI formats, the messages can be efficiently delivered between sellers and outsource suppliers.

As one example, EDI messages can be sent through value added networks (VAN). For example, the seller's computer system is coupled to the VAN, and passes its messages to the VAN. Those messages are then routed to outsource supplier's computer system through their own VAN. Of course, this is just one example of how messages can be delivered between the sellers and outsource suppliers. Other methods can use internet communication protocols such as email based systems. Other methods can use web site based systems where the seller and outsource supplier log into web sites that are configured to deliver messages between the sellers and outsource suppliers. In all of these methods, the various messages used in methods 200, 300 and 400 are automatically delivered between sellers and outsource suppliers.

Figure 5:
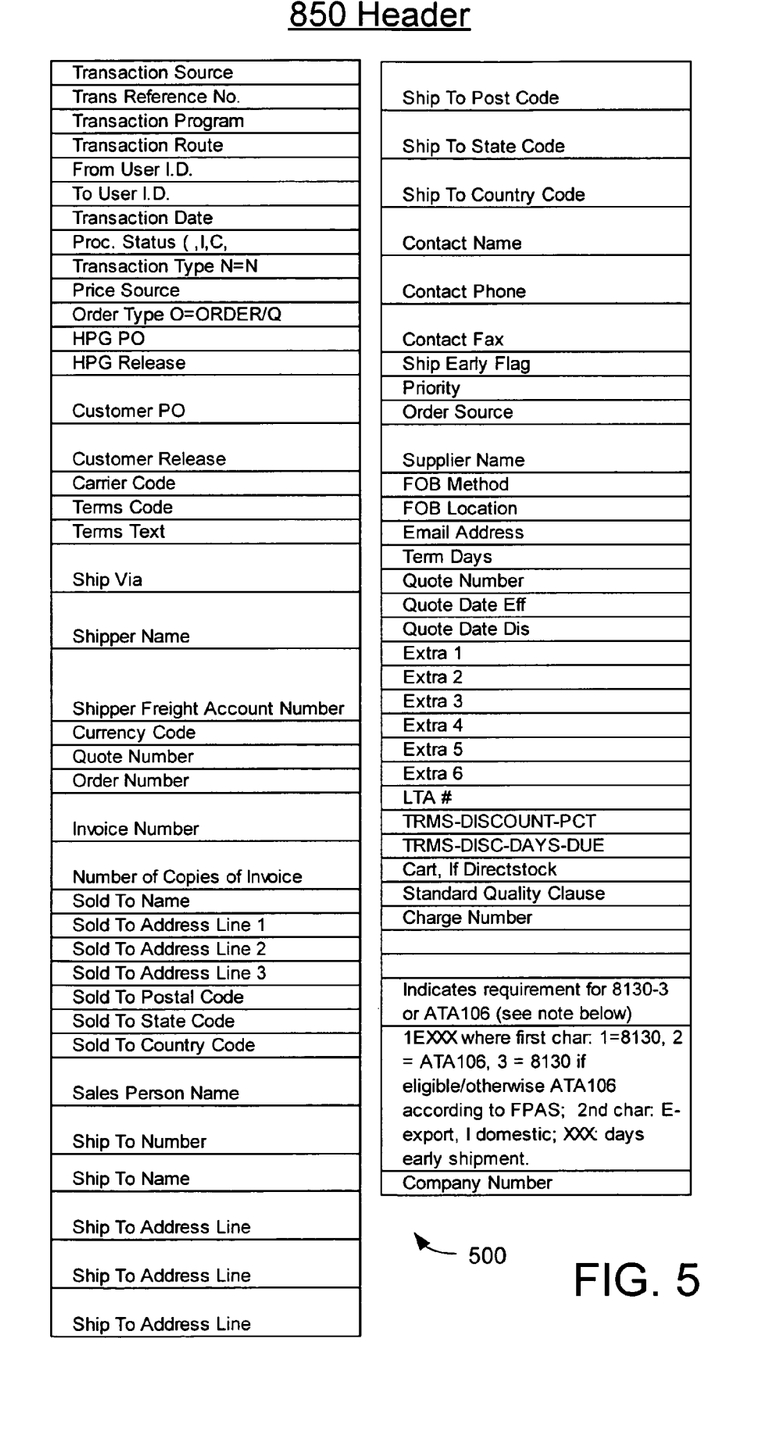
FIGS. 5 and 6 are tables illustrating exemplary EDI 850 message data fields.
Figure 6:
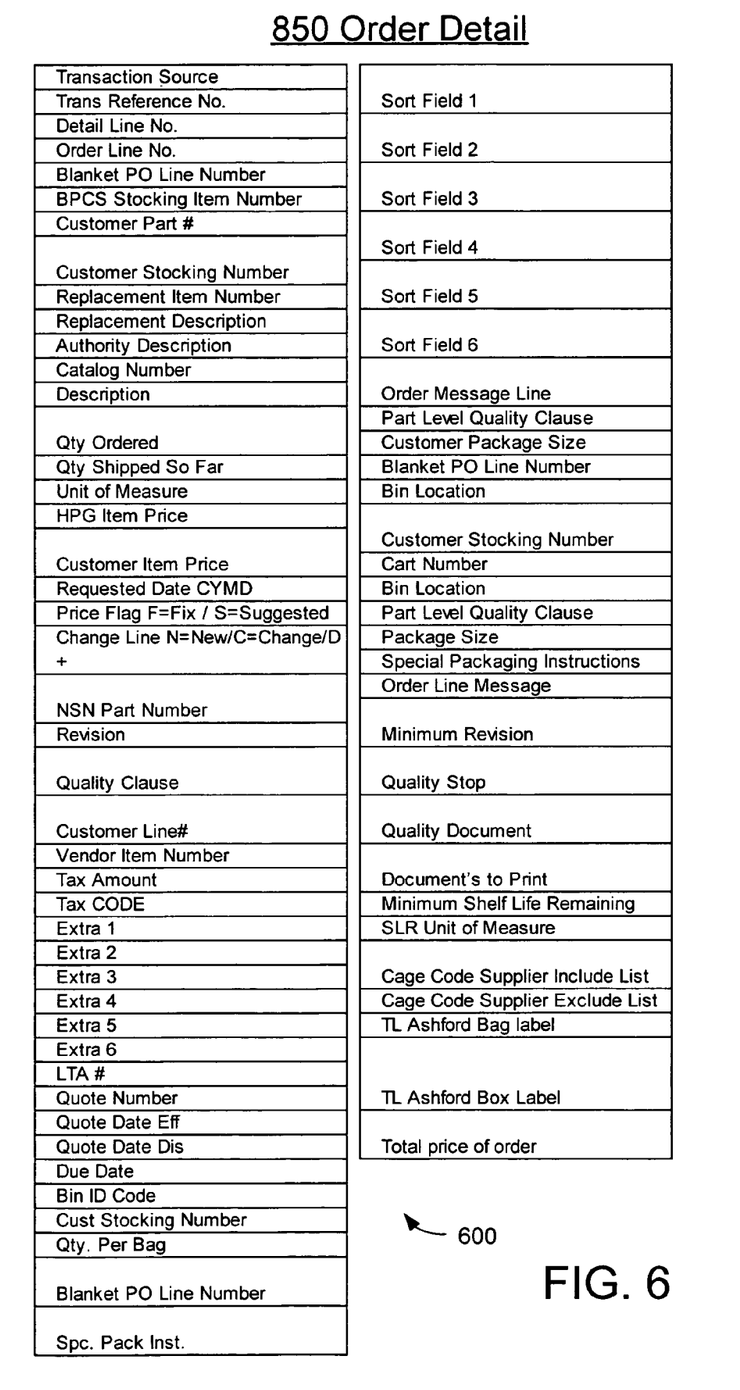

As stated above, in one exemplary embodiment, the messages sent between buyers and sellers are formatted as various EDI messages, such as 850, 855, 856, 860 and 865 messages. In these cases, the data in the messages are formatted to include the needed date to accomplish the message task. Turning now to FIGS. 5 and 6, tables 500 and 600 illustrate exemplary data fields included in an EDI 850 message used to send order data to the outsource supplier. Specifically, table 500 lists the data fields in an exemplary 850 Header, and table 600 lists the data fields in an exemplary 850 Detail. The 850 Header includes fields related to the order parameters, such as customer number, shipment method and address. The 850 Detail includes details about the ordered part itself. This includes special attributes such as the quantity and manufacturer of the ordered part.

Figure 7:
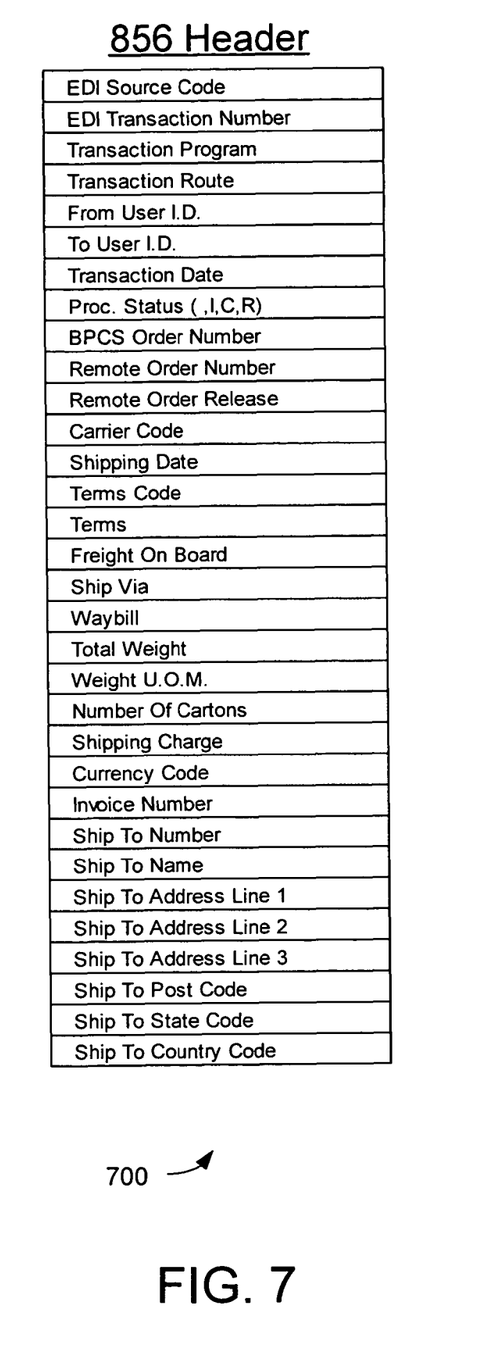
FIGS. 7, 8 and 9 are tables illustrating exemplary EDI 856 message data fields.
Figure 8:
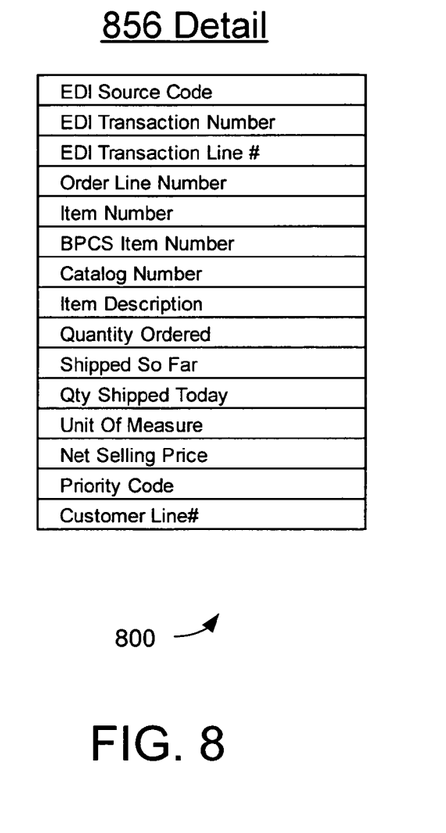
Figure 9:
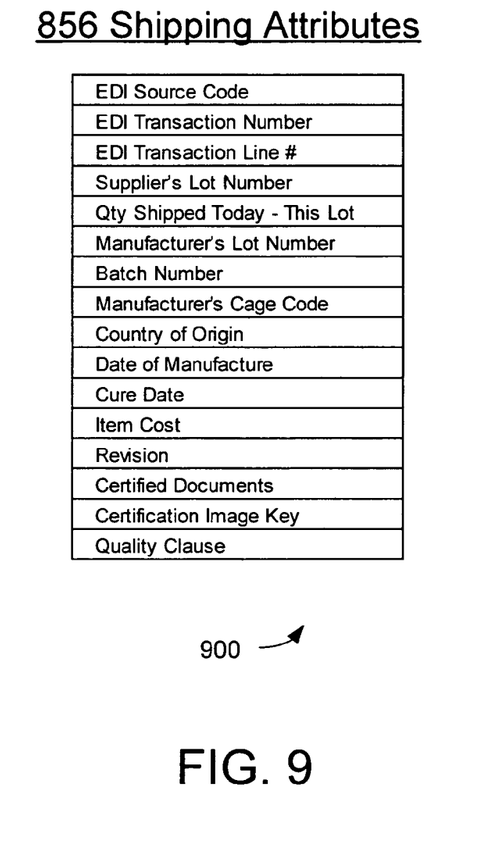

Turning now to FIGS. 7, 8 and 9, tables 600, 700 and 800 illustrate exemplary data fields included in an EDI 856 message, which can be used to send acknowledgement shipment data back to the seller as described with reference to method 200. As such, it includes details about the items that are shipped to the customer by the outsource supplier. Specifically, table 700 lists the data fields in an exemplary 856 Header, table 800 lists the data fields in an exemplary 856 Detail, and table 900 lists the data fields in an exemplary 856 Shipping Attributes. The 856 Header again includes general attributes about the order, such as order number and shipping address. The 856 Detail includes details about the shipped part, including item descriptions, quantities shipped and such. The 856 Shipping Attributes includes technical details about the part. These details can include lot numbers, batch numbers, date of manufacture, certification details and such. As described above, including these details about the shipment in a message to the seller allows the seller to create the lot records needed for item traceability.

Of course these are just examples of the type of data and type of formatting that can be used in such a message. Likewise, other messages between sellers and outsource suppliers can use similar formatting and types of data.

It should be noted that the system is preferably configured to generate the messages between sellers and outsource suppliers automatically. As such, the various fields in the various messages would be filled by appropriate data from the sellers and outsource suppliers inventory control systems automatically when orders are placed, processed and shipped. Thus, the system is tightly integrated with the existing inventory control systems for both the seller and the outsource supplier.

Figure 10:
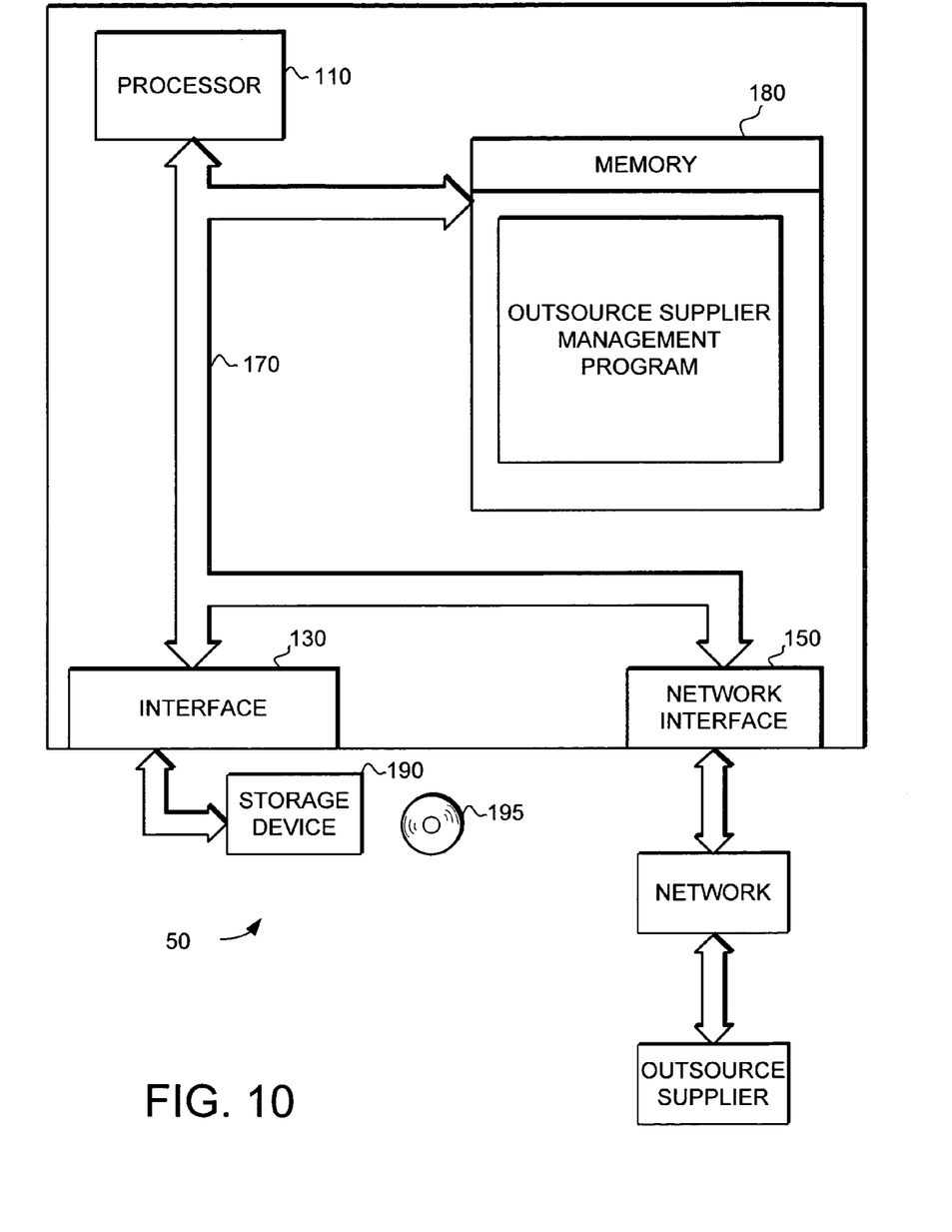
FIG. 10 is a schematic view of an exemplary computer system including an outsource supplier management program.

The outsource supplier management system and method can be implemented in wide variety of platforms. Turning now to FIG. 10, an exemplary computer system 50 is illustrated. Computer system 50 illustrates the general features of a computer system that can be used to implement the invention. Of course, these features are merely exemplary, and it should be understood that the invention can be implemented using different types of hardware that can include more or different features. It should be noted that the computer system can be implemented in many different environments, such as on personal computer network servers, minicomputers and mainframe systems. The exemplary computer system 50 includes a processor 110, an interface 130, a network interface 150, a storage device 190, a bus 170 and a memory 180. In accordance with the preferred embodiments of the invention, the memory system 50 includes an outsource supplier management program.

The processor 110 performs the computation and control functions of the system 50. The processor 110 may comprise any type of processor, include single integrated circuits such as a microprocessor, or may comprise any suitable number of integrated circuit devices and/or circuit boards working in cooperation to accomplish the functions of a processing unit. In addition, processor 110 may comprise multiple processors implemented on separate systems. During operation, the processor 110 executes the programs contained within memory 180 and as such, controls the general operation of the computer system 50.

Memory 180 can be any type of suitable memory. This would include the various types of dynamic random access memory (DRAM) such as SDRAM, the various types of static RAM (SRAM), and the various types of non-volatile memory (PROM, EPROM, and flash). It should be understood that memory 180 may be a single type of memory component, or it may be composed of many different types of memory components. In addition, the memory 180 and the processor 110 may be distributed across several different computers that collectively comprise system 50.

The bus 170 serves to transmit programs, data, status and other information or signals between the various components of system 100. The bus 170 can be any suitable physical or logical means of connecting computer systems and components. This includes, but is not limited to, direct hard-wired connections, fiber optics, infrared and wireless bus technologies.

The interface 130 allows communication to the system 50, and can be implemented using any suitable method and apparatus. It can include a network interfaces to communicate to other systems, terminal interfaces to communicate with technicians, and storage interfaces to connect to storage apparatuses such as storage device 190. Storage device 190 can be any suitable type of storage apparatus, including direct access storage devices such as hard disk drives, flash systems, floppy disk drives and optical disk drives. As shown in FIG. 10, storage device 190 can comprise a disc drive device that uses discs 195 to store data.

The network interface 150 allows the computer system 50 to communicate with other systems, including the systems used by the outsource supplier, and can be implemented using any suitable method and apparatus. As one example, the system 50 can communicate with the outsource supplier using value added networks and the internet. Typically, such communication would be controlled through a firewall that allows only communication with the correct parameters to pass through. In such a system, outside communication can be received through the seller's external technology group or could be sent directly through the ISP providing the value added network.

In accordance with the preferred embodiments of the invention, the computer system 50 outsource supplier management program. Specifically during operation, the outsource supplier management program is stored in memory 180 and executed by processor 110. When being executed by the processor 110, outsource supplier management program receives customer orders, requests for product returns, and request for order changes. The outsource supplier management program processes these requests and communicates with the outsource suppliers systems to fulfill product requests.

As one example implementation, the outsource supplier management program can be implemented on AS/400 or other suitable system and communicate with outsource suppliers through EDI messages delivered over value added networks.

It should be understood that while the present invention is described here in the context of a fully functioning computer system, those skilled in the art will recognize that the mechanisms of the present invention are capable of being distributed as a program product in a variety of forms, and that the present invention applies equally regardless of the particular type of signal bearing media used to carry out the distribution. Examples of signal bearing media include: recordable media such as floppy disks, hard drives, memory cards and optical disks (e.g., disk 195), and transmission media such as digital and analog communication links, including wireless communication links.

The present invention thus provides a system and method for outsource supplier management. The system and method facilitates improved order communication between customers, sellers and outsource suppliers. The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. A method of outsource supplier management, the method comprising the steps of:

provid­ing a storage medium for storing data and programs used in processing data;

providing a processing unit for processing data;

receiving a customer order at a seller, the customer order identifying an ordered product;

sending a first message through a computer network from the seller to an outsource supplier, the first message comprising order data identifying the ordered product;

shipping the ordered product from the outsource supplier to the customer;

transmitting a second message through the computer network to the seller, the second message comprising shipping data describing the shipment of the ordered product to the customer;

transforming the received shipping data for the ordered product into a data record that represents the ordered product;

adding the ordered product identified in the data record into inventory at the seller;

creating an invoice to pay the outsource supplier for the ordered product;

matching the customer order to the inventory using the processing unit, and decreasing inventory by removing the ordered product from the inventory at the seller; and billing the customer for the ordered product.

2. The method of claim 1 further comprising the step of attempting to allocate from existing inventory prior to the step of sending the first message comprising order data from the seller to the outsource supplier.

3. The method of claim 1 further comprising the steps of:
receiving a request for a change in a pending order;
notifying the outsource supplier of the change in the pending order; and
receiving notification from the outsource supplier when the change in the pending order is processed.

4. The method of claim 3 further comprising the steps of determining if the outsource supplier requires notification of the request for a change in the pending order.

5. The method of claim 1 wherein the step of adding the ordered product identified in the data record into inventory at the seller further comprises creating a lot record, the lot record including details of the ordered product that facilitate traceability of the ordered product.

6. The method of claim 1 further comprising the steps of:
receiving a returned product and adding it into the inventory at the seller;
receiving a virtual negative shipment from the outsource supplier when the outsource supplier receives the returned product wherein the virtual negative shipment is contained in a third message;
removing the returned product from the inventory at the seller upon receipt of the negative shipment; and
sending a negative payment to the outsource supplier upon receipt of the negative shipment.

7. The method of claim 6 further comprising the step of requesting authorization from the outsource supplier to return the returned product to the outsource supplier.

8. The method of claim 6 wherein the step of receiving a returned product into the inventory at the seller further comprises the steps of inspecting the returned product and shipping the returned product to the outsource supplier.

9. The method of claim 1 further comprising the step of sending an acknowledgement message from the outsource supplier to the seller upon receipt at the outsource supplier of the order data identifying the ordered product from the seller.

10. A method of outsource supplier management, the method comprising the steps of:
providing a storage medium for storing data and programs used in processing data;
providing a processing unit for processing data;
receiving from a customer an order for a product;
determining that the product is not in inventory of a first entity;
identifying a price for the product and then sending a first message through a computer network from the first entity to an outsource supplier, the first message comprising order data identifying the product;
receiving, by the first entity, a second message from the outsource supplier through a computer network, the second message comprising shipping data describing the shipment of the product to the customer;
transforming the received shipping data for the product into a data record that represents the product and adding the product identified in the data record into the inventory of the first entity;
matching the order from the customer to the product in inventory of the first entity using the processing unit, and decreasing the inventory by removing the product from inventory; and
billing the customer for the product.

11. The method of claim 10 further comprising the step of:
receiving a returned product and adding it into inventory of the first entity;
receiving a virtual negative shipment from the outsource supplier when the outsource supplier receives the returned product wherein the virtual negative shipment is contained in a third message;
removing the returned product from inventory upon receipt of the negative shipment; and
sending a negative payment to the outsource supplier upon receipt of the negative shipment.

12. The method of claim 11 further comprising the step of requesting authorization from the outsource supplier to return the returned product to the outsource supplier.

13. The method of claim 11 wherein the step of receiving a returned product into the inventory at the first entity further comprises the steps of inspecting the returned product and shipping the returned product to the outsource supplier.

14. The method of claim 10 further comprising the steps of;
receiving a request for a change in the order;
notifying the outsource supplier of the change in the order; and
receiving notification from the outsource supplier when the change in the order is processed.

15. The method of claim 14 further comprising the steps of determining if the outsource supplier requires notification of the request for a change in the order.

16. The method of claim 15, wherein the change to the order is a change in quantity of the product.

17. A method of outsource supplier management, the method comprising the steps of:
providing a storage medium for storing data and programs used in processing data;
providing a processing unit for processing data;
receiving from a customer an order for a product;
determining that the product is not in a seller's inventory and sending, through a value added network, a first message from the seller to an outsource supplier, the first message comprising order data identifying the product;
resending, when no acknowledgement of the first message has been received by the seller from the outsource supplier, the first message from the seller to the outsource supplier;
sending a second message from the outsource supplier to the seller through the value added network, the second message comprising shipping data for the product;
transforming the received shipping data for the product into a data record that represents the product;
adding the product identified in the data record into inventory at the seller;
creating an invoice to pay the outsource supplier for the product;
matching the customer order to the product in inventory using the processing unit, and decreasing inventory by removing the product from the inventory at the seller; and
billing the customer for the product, wherein the first and second messages are in Electronic Data Interchange (EDI) format.

18. The method of claim 17 wherein the step of adding the product into inventory at the seller further comprises creating a lot record, the lot record including a plurality of information about the ordered product.

* * * * *